3,275,725
METHOD OF MAKING LAMINATED TUBING
Kastulus Utz, Freising, Upper Bavaria, Germany, assignor, by mesne assignments, to Multifol Patentverwertungs-A.G., Chur, Switzerland
Filed Sept. 19, 1962, Ser. No. 224,764
1 Claim. (Cl. 264—95)

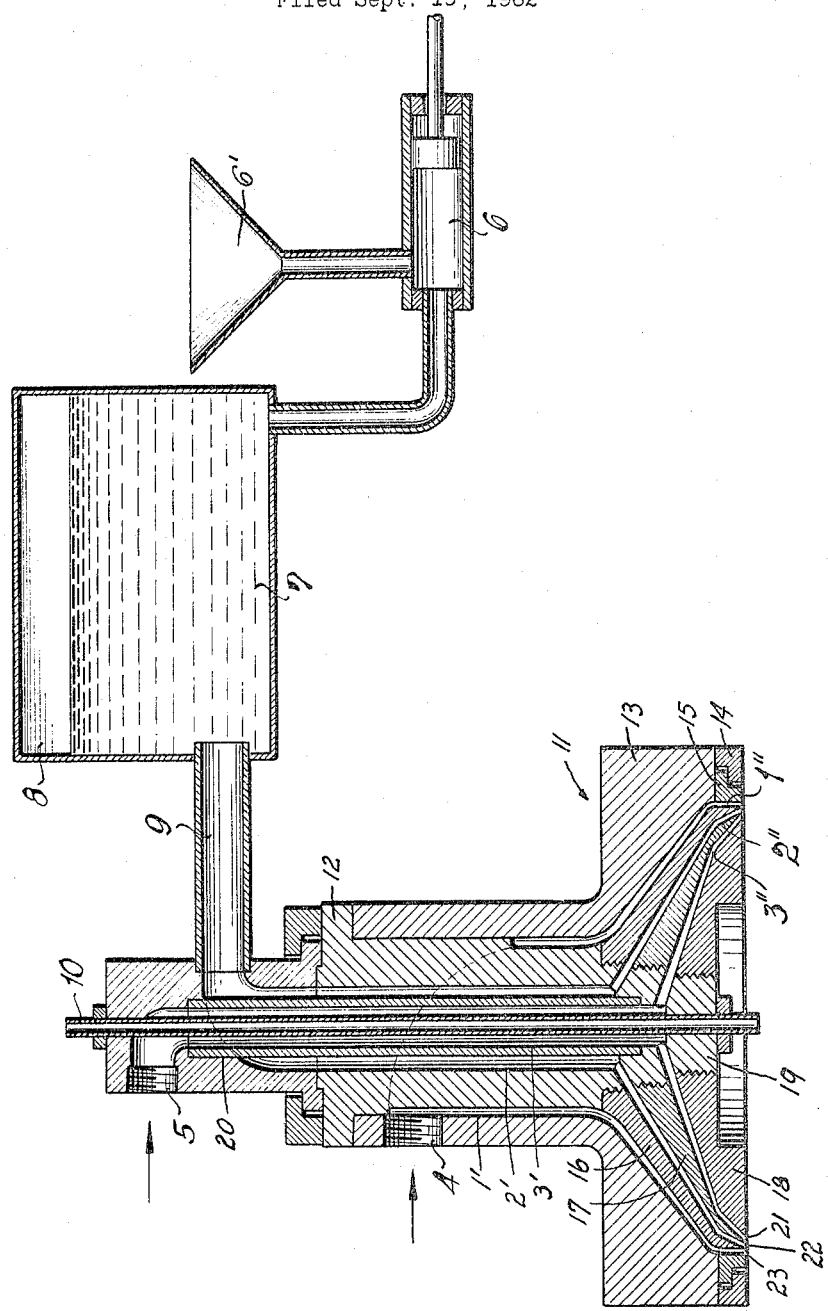

This invention relates to laminated tubing and is concerned with a method for making same. The method and apparatus of the invention makes use of the known technique of simultaneously extruding two or more tubular formations of thermoplastic material, particularly synthetic resin compositions, hereinafter referred to as plastics, while in a condition of plasticity, through concentric annular shaping orifices of a die assembly, and of bonding such formations to each other, while still hot, by interiorly applied pressure, ordinarily by blowing.

Known methods of making laminates by extrusion-blowing are for obvious reasons limited to the use of plastics which are capable of becoming softened and workable when heated at relatively low temperatures and which, while soft and workable, may be expanded under fluid pressure. For instance, low, medium and high density polyethylene, polystyrene, plasticized and nonplasticized polyvinyl chloride, and polyamides (nylon) may be used. While extrusion-blowing methods and apparatus have successfully been used to make, for instance, two plastics films and to combine same while they are being made, it was so far unknown and impossible both to make plastics films and to combine them with materials other than plastics by one and the same method or in one and the same apparatus. My present invention has for one of its objects the provision of a method to make plastics films and to combine them with materials other than plastics in a single operation.

Broadly speaking, the primary object of the invention is to generally improve the manufacture of laminated materials, to broaden the aspects of such manufacture, and to simplify, cheapen and speed up the manufacture.

The foregoing objects and such other objects as will be apparent from the following description are achieved according to the invention by simultaneously extruding in a condition of plasticity at least a first and a second substantially tubular formation of expandable thermoplastic synthetic resin compositions. The second formation surrounds spacedly the first formation. The first formation defines interiorly a cylindrical space, and defines together with the second formation an annular space between the two formations. A molten metal is fed into said annular space. An expanding medium is now admitted in said cylindrical space to make the outer face of said first or inner formation adhere to the metal, and the latter adhere to the inner face of said second or outer formation. In this way, a tubing consisting of at least three laminae is formed.

The specification is accompanied by a drawing which illustrates by way of example, and in a sectional view, an apparatus for performing the method of the invention, the section being taken through parts associated with a die assembly and in a plane of the axis of said die assembly.

Referring to the drawing in greater detail now, a die assembly generally designated 11 is the delivery end of an extruder, for instance, a screw extruder, said delivery end being shown only. Fastened to a head 12 of a cylinder of the extruder is a die adapter 13. A retaining ring 14 which is to be bolted to the front face of the adapter 13 holds an annular plate 15. Three die members 16, 17 and 18 each of which has the shape of a hollow frustum are threadedly connected to an axial extension 19 of the cylinder head 12. Two pipes 10 and 20 extend in the common axis of the cylinder head and die assembly.

The pipe 10 forms a conduit by itself and defines together with the pipe 20, the cylinder head 12, and a portion of the die adapter 13, three axially extending passageways 1', 2' and 3' followed by conically shaped passageways 1", 2" and 3". The latter are formed by the die members 16, 17 and 18 and the other portion of the die adapter 13.

The cylinder head and the die assembly shown constitute a common head of two extrusion units and serve to make a three-layer laminate. The passageways or passages 1", 2", 3" terminate in orifices 21, 22 and 23, respectively, in the face portion of the die assembly. The passages 1', 1", 3', 3" conduct a plastics material or materials, whereas the passage 2', 2" conducts a molten metal such as lead. Plastics material in softened condition is supplied under pressure at openings 4 and 5 to move through the passages 1', 1", 3', 3", respectively. The molten metal is transferred by a piston pump 6 which is provided with a hopper 6' to a container 7 and thence through a duct 9 into the passage 2'. The container 7 is formed as a chamber to equalize the flow of the molten metal, with 8 being air or a gas above the metal. The tube 10 is provided to admit a fluid, such as air, under pressure in the direction in which the plastics material or materials flow.

The aforedescribed apparatus operates as follows:

Supply of softened thermoplastic material is effected, for instance, by two rotating helical screws which are power-driven and force the material into the openings 4 and 5. Two extrusion units are used if two different plastics are employed, differing either in color or in other respects. If the same kind of plastics material is to enter both at 4 and 5, a single extruder of a relatively higher capacity may be used. The extruders are equipped to heat the material to compress same and to force the plastic mass through the passages 1', 1" and 3', 3". The plastics are discharged at 21 and 23, respectively. The orifices 21 and 23 are provided so as to ensure the formation of a very narrow annular space between two tubular formations emerging from the orifices. A metal in fluid condition is discharged through the orifice 22 to enter into the annular space between the two tubular formations. As the two tubular plastics formations and a tubular body of molten lead emerge from the orifices 21, 23, 22, a fluid pressure medium from a suitable source is admitted through the pipe 10 to effect an outwardly directed expanding action upon the tubular triple structure, thereby making the plastics layers and the metal layer sandwiched between the plastics layers strongly adhere to each other.

The following examples are further illustrative of the method of the invention.

*Example 1*

In using the illustrated die assembly, nylon is extruded through the orifices 21, 23, while a molten tin-lead alloy is delivered through the orifice 22. The point of solidification of the molten alloy is to be below the point of solidification of the nylon (polyamide) used since I have found that premature solidification of the metal results in ruptures of the metal foil in the finished product. The temperature at which nylon is extruded ranges from 230° to 250° C., whereas the tin-lead alloy consisting of 32% tin and 68% lead has a melting point of 202° C. The two tubular plastics formations, on extrusion, give the metal full support so that upon the action, for instance, of air under pressure, the three components, namely, nylon, alloy, and nylon, will uniformly consolidate and form a perfect three-web laminate. The thickness of the individual layers depends on the degree of expansion, that is, the ratio between the diameters of the nonexpanded and expanded tubing, as well as on the rate at which the three-layer tubing is taken off from the extrusion head. The ratio between the thickness of the individual layers can be controlled by the amounts of material used for the various layers. A valuable product has been obtained by using thicknesses of 20 micron nylon, 20 micron tin-lead alloy, and 20 micron nylon.

A film thus produced is an excellent gas and aroma-tight composite packaging material and is a positive barrier to light. It shields from alpha particles to a large extent.

*Example 2*

The extrusion-blowing procedure is similar, but instead of nylon a mixed polymerization product of polytetrafluoroethylene and polyhexafluoropropylene is used, and the aforesaid tin-lead alloy is replaced by lead. The temperature at which the polymerization product is extruded ranges between 350° and 400° C. Lead melts at 327° C. so that the point of solidification of the molten metal is again lower than the point of solidification of the plastic. The die assembly and the procedure have been adjusted to furnish a tubing having a lead layer of 100 micron thickness and plastics layers each of 50 micron thickness. The tubing is a perfect shield against alpha particles and even absorbs beta particles of an energy of approximately 0.2 m.e.v.

It is believed that the method of the invention, and the many advantages thereof, will be fully understood from the foregoing detailed description. The method of the invention permits the use of new materials for laminates and widens the range of possible characteristics. The product made according to the invention, in addition to being an excellent packaging material by offering protection from moisture and light and by being gas and aroma-tight, and durable, may be made to embody protective properties as a shield against radioactivity, as well as other properties which could not be ensured up to now.

It will be appreciated that metals other than those mentioned hereinbefore may be used for the purposes of the invention, as long as they can be held in a fluid condition while the plastics films are extruded. Metals sandwiched between plastics films can be used in extremely thin sections without impairing the durability of the product since they are protected by tough plastics covers.

It is within the scope of the invention to combine, for instance, two plastics layers, a metal layer, and a plastics layer, or a plastic layer, a metal layer, a plastic layer, another metal layer, and again a plastic layer.

It will be apparent that, while I have shown and described my invention in a few forms only, many changes and modifications may be made without departing from the spirit of the invention defined in the following claim.

I claim:

A method of producing thin-walled laminated tubing which comprises:
  (a) simultaneously extruding at least a first and second substantially tubular formation of expandable, thermoplastic, synthetic resin composition while at an extrusion temperature at which said compositions are in a condition of plasticity,
    (1) said first formation defining a cylindrical space and being spacedly surrounded by said second formation,
    (2) said first and second formations defining a substantially annular space therebetween;
  (b) feeding molten metal into said annular space;
    (1) the solidification temperature of said metal being lower than the solidification temperatures of said compositions and lower than said extrusion temperature;
  (c) admitting a fluid expanding medium to said cylindrical space under pressure until the outer face of said first formation adheres to said metal, and said metal adheres to the inner face of said second formation, whereby a tubing having three laminae is formed; and
  (d) allowing said tubing to solidify.

References Cited by the Examiner

UNITED STATES PATENTS

| | | | |
|---|---|---|---|
| 318,458 | 5/1885 | Fletcher | 138—138 |
| 2,173,359 | 9/1939 | Freedlander | 138—138 |
| 2,553,690 | 5/1951 | Walsh. | |
| 2,632,205 | 3/1953 | Fitz Harris | 264—173 |
| 2,932,323 | 2/1957 | Aries | 264—209 |
| 2,980,958 | 4/1961 | Ellis. | |
| 2,991,504 | 7/1961 | Eppler. | |
| 3,003,223 | 10/1961 | Breen | 264—171 |
| 3,057,013 | 10/1962 | Loveless. | |
| 3,187,982 | 7/1965 | Underwood et al. | 264—95 |

ROBERT F. WHITE, *Primary Examiner.*

EDWARD BENHAM, ALEXANDER H. BRODMERKEL, *Examiners.*

L. G. FOSTER, J. R. DUNCAN, J. R. HALL,
*Assistant Examiners.*